No. 666,122. Patented Jan. 15, 1901.
M. WADDELL.
METHOD OF CONTROLLING ELECTRIC MOTORS.
(Application filed Dec. 13, 1900.)
(No Model.)
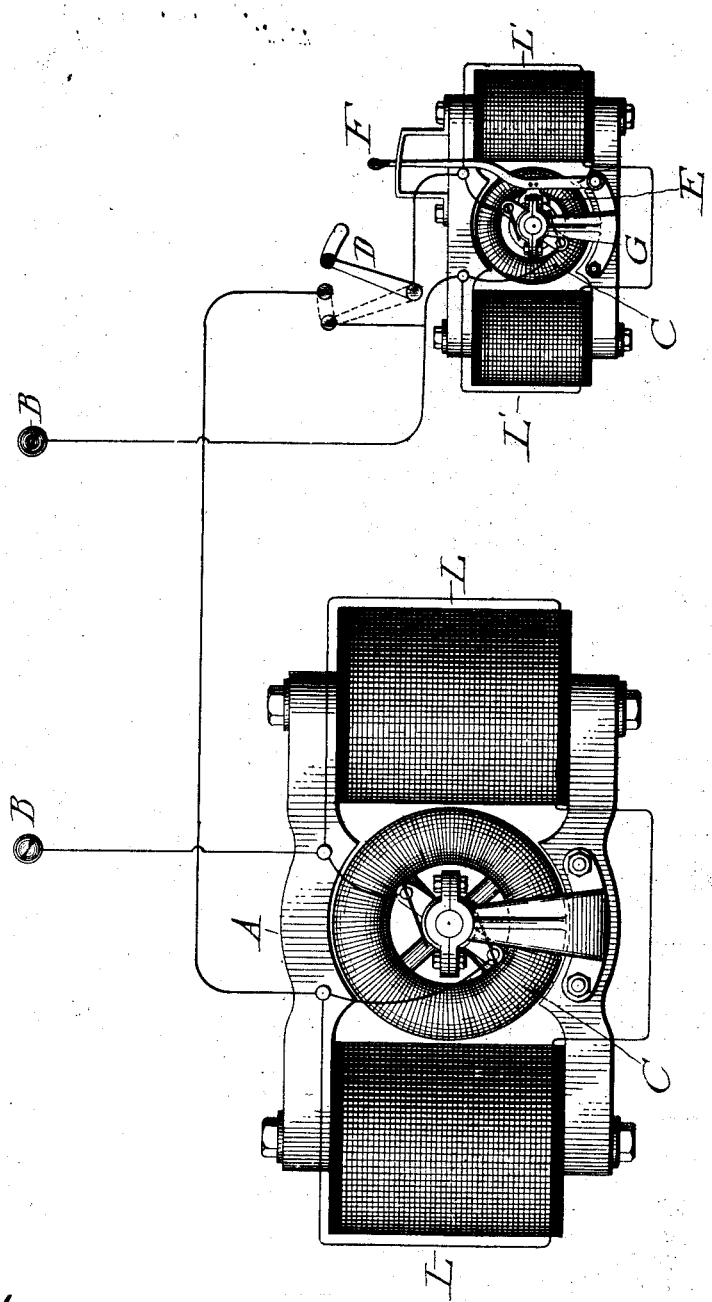
Witnesses:
A. E. Grant
H. R. Croghan
Inventor.
Montgomery Waddell,
by Hennie & Goldsborough,
Attorneys.
THE NORRIS PETERS CO., PHOTO-LITHO., WASHINGTON, D. C.

UNITED STATES PATENT OFFICE.

MONTGOMERY WADDELL, OF NEW YORK, N. Y., ASSIGNOR TO THE GENERAL ELECTRIC COMPANY, OF NEW YORK.

METHOD OF CONTROLLING ELECTRIC MOTORS.

SPECIFICATION forming part of Letters Patent No. 666,122, dated January 15, 1901.

Original application filed January 18, 1897, Serial No. 619,677. Divided and this application filed December 13, 1900. Serial No. 39,676. (No model.)

*To all whom it may concern:*

Be it known that I, MONTGOMERY WADDELL, a British subject, residing at New York, county of New York, and State of New York, have invented certain new and useful Improvements in Methods of Controlling Electric Motors; and I do hereby declare the following to be a full, clear, and exact description of the invention, such as will enable others skilled in the art to which it appertains to make and use the same.

My invention relates to a novel method of controlling electric motors whereby the motor when loaded may be readily actuated from the electrical source of power or when in operation may be instantly or gradually stopped or its speed of rotation diminished without the application of mechanical braking devices. It is well known that an electric motor when loaded cannot be readily operated from the actuating-dynamo to run on constant potential, owing to the motor forming a dead short-circuit, until it obtains its speed and maintains an equal potential to that of the feeding-conductors. To obviate this difficulty, it has heretofore been customary to interpose resistances in series with the electric source of power and the motor and then gradually reduce the resistances to nothing, by which time the motor would have received its full speed and would have acquired the same potential as that of the conductors.

The purpose of my invention is to substitute in series for the resistances referred to a second motor of smaller size, which motor, having a comparatively inappreciable load to carry, will at once attain its full speed and full potential. The speed of the small motor is then diminished by mechanical means or otherwise, thereby lowering its counter electromotive force and permitting a current to flow through it and through the large motor, the latter beginning to operate when this current reaches a certain point. The speed of the small motor being still further decreased, the potential of the large one will increase until when the small motor is stopped the large one is running on full potential, whereupon the small motor may be cut out of the circuit. By my method I am also enabled to stop the large motor without the application of brakes thereto, the interruption of the motion being effected either gradually or instantly, as desired.

In the accompanying drawing I have illustrated an arrangement of apparatus for carrying out my method, which apparatus is identical with that described and claimed in my application, Serial No. 619,677, filed January 18, 1897, and of which the present application is a division.

In the drawing, A is an ordinary type of motor provided with the field-coils L and armature C.

B indicates the terminals of a dynamo-electric machine or its equivalent, of any convenient construction, and interposed in series between the dynamo-electric machine B and the motor A is a small motor G, provided with a cut-out switch D and a brake E, operated by the brake-lever F.

In starting up the motor A the small motor G is introduced in series by means of the switch D. It immediately attains its full speed and total electromotive force from the source of power. The brake-lever F is thereupon applied, reducing the speed of motor G, thereby causing its counter electromotive force to drop and permitting a current to flow through it and through the large motor A. The application of the brake is continued and the speed of the small motor further diminished until a sufficient current passes through the large motor A to start it in operation. The speed of the small motor being still further decreased, the speed of the large motor will increase proportionately and the potential of the same will rise in proportion as that of G drops, until when G is brought to a full stop the large motor A is running on full potential. The small motor G may then be cut out of circuit by throwing the switch into the position shown in the dotted lines in the drawing.

It is evident that the switch and the means for controlling the speed of the small motor G may constitute one and the same device, so as to be operated by a single manipulation.

The motors may be shunt-wound or may be wound in series, according to the purpose for which they are to be employed. It is preferable, however, to have shunt-fields for the small motor G, as they can then be on before the main switch is closed.

While I have shown the secondary motor as entirely independent of mechanical connection with the primary motor, it is evident that the two may be built in together upon the same frame and framework without departing from the spirit of my invention.

Having thus described my invention, what I claim, and desire to secure by Letters Patent, is—

1. The method of varying the speed of an electric motor which consists in placing in series with its armature the armature of a dynamo-electric machine, generating by dynamic induction in the armature of said dynamo-electric machine a counter electromotive force, and varying the counter electromotive force so generated, substantially as described.

2. The method of starting, operating, and controlling an electric motor at any speed desired which consists in exciting its field, supplying its armature with current, passing the current supplied to said armature through a regulating-armature in series therewith, causing said regulating-armature to cut lines of force, and varying the rate of cutting of lines of force by said regulating-armature, substantially as described.

3. The method of operating an electric motor at any speed desired which consists in exciting its field, supplying its armature with current, passing the current supplied to said armature through a regulating-armature in series therewith, causing said regulating-armature to cut lines of force, and varying the speed of said regulating-armature by subjecting it to a load, substantially as described.

In testimony whereof I affix my signature in presence of two witnesses.

MONTGOMERY WADDELL.

Witnesses:
M. S. DODGE,
ADALINE BLAUVELT.